(12) United States Patent
Damberg et al.

(10) Patent No.: US 11,637,996 B2
(45) Date of Patent: Apr. 25, 2023

(54) HIGH LUMINANCE PROJECTION DISPLAYS AND ASSOCIATED METHODS

(71) Applicant: DOLBY LABORATORIES LICENSING CORPORATION, San Francisco, CA (US)

(72) Inventors: Gerwin Damberg, Vancouver (CA); Martin J. Richards, Gig Harbor, WA (US); Craig Todd, Mill Valley, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 731 days.

(21) Appl. No.: 16/660,585

(22) Filed: Oct. 22, 2019

(65) Prior Publication Data

US 2020/0053329 A1 Feb. 13, 2020

Related U.S. Application Data

(63) Continuation of application No. 15/147,238, filed on May 5, 2016, now Pat. No. 10,462,437, which is a
(Continued)

(51) Int. Cl.
*G03H 1/00* (2006.01)
*H04N 9/31* (2006.01)
(Continued)

(52) U.S. Cl.
CPC ......... *H04N 9/3147* (2013.01); *G03H 1/0005* (2013.01); *G03H 1/0891* (2013.01);
(Continued)

(58) Field of Classification Search
CPC .............. H04N 9/3147; H04N 9/3161; H04N 9/3182; H04N 5/74; H04N 9/31;
(Continued)

(56) References Cited

U.S. PATENT DOCUMENTS

| 5,426,521 | A | * | 6/1995 | Chen | ...................... | G02B 27/46 |
| | | | | | | 359/9 |
| 5,428,417 | A | | 6/1995 | Lichtenstein | | |

(Continued)

FOREIGN PATENT DOCUMENTS

| CN | 1675597 | 9/2005 |
| CN | 101034279 | 9/2007 |

(Continued)

OTHER PUBLICATIONS

Damera-Venkata, N. et al, "A Unified Paradigm for Scalable Multi-Projector Displays," IEEE Transactions on Visualization and Computer Graphics, vol. 13, Issue 6, 2007.
(Continued)

*Primary Examiner* — Jade R Chwasz

(57) ABSTRACT

Projection displays include a highlight projector and a main projector. Highlights projected by the highlight projector boost luminance in highlight areas of a base image projected by the main projector. Various highlight projectors are based on steerable beams, holographic projectors, and spatial light modulators. A Fourier transform component and a mask positioned on the Fourier plane thereof are used to attenuate or eliminate selected spatial frequencies, e.g., to increase peak luminance without raising the black level of the projected image.

18 Claims, 10 Drawing Sheets

Related U.S. Application Data continuation of application No. 14/112,347, filed as application No. PCT/US2012/032995 on Apr. 11, 2012, now abandoned.

(60) Provisional application No. 61/476,949, filed on Apr. 19, 2011.

(51) Int. Cl.
| | | |
|---|---|---|
| *G06T 11/00* | (2006.01) | |
| *G03H 1/08* | (2006.01) | |
| *G03H 1/16* | (2006.01) | |
| *G03H 1/22* | (2006.01) | |

(52) U.S. Cl.
CPC .............. *G03H 1/16* (2013.01); *G03H 1/2249* (2013.01); *G03H 1/2294* (2013.01); *G06T 11/001* (2013.01); *H04N 9/3161* (2013.01); *H04N 9/3182* (2013.01); *G03H 2001/0088* (2013.01); *G03H 2001/2284* (2013.01)

(58) Field of Classification Search
CPC ...... G03H 1/0005; G03H 1/0891; G03H 1/16; G03H 1/2249; G03H 1/2294; G03H 2001/0088; G03H 2001/2284; G03H 2001/221; G03H 2225/32; G03H 2001/2215; G03H 2001/2221; G03H 2240/51; G06T 11/001; G03B 21/00
See application file for complete search history.

(56) References Cited

U.S. PATENT DOCUMENTS

| | | | |
|---|---|---|---|
| 5,612,753 | A | 3/1997 | Poradish |
| 5,988,816 | A | 11/1999 | Quadri |
| 6,011,874 | A | 1/2000 | Gluckstad |
| 6,021,223 | A * | 2/2000 | Toyoda ................ G06E 3/005 382/214 |
| 6,490,364 | B2 | 12/2002 | Hanna |
| 6,751,006 | B2 | 6/2004 | Zhou |
| 6,911,977 | B2 | 6/2005 | David |
| 6,984,043 | B2 | 1/2006 | Nakamura |
| 7,072,509 | B2 | 7/2006 | Hunter |
| 7,082,218 | B2 | 7/2006 | Pollard |
| 7,111,941 | B2 | 9/2006 | Allen et al. |
| 7,133,201 | B2 | 11/2006 | Pate |
| 7,400,439 | B2 | 7/2008 | Holman |
| 7,492,948 | B2 | 2/2009 | Gluckstad |
| 7,697,191 | B2 * | 4/2010 | Gluckstad ............ G02B 21/14 382/214 |
| 7,784,938 | B2 | 8/2010 | Richards |
| 2001/0010537 | A1 | 8/2001 | Lang |
| 2003/0006985 | A1 | 1/2003 | David |
| 2004/0077865 | A1 | 4/2004 | Zhao |
| 2006/0072075 | A1 | 4/2006 | De Vaan |
| 2006/0147152 | A1 | 7/2006 | Lu |
| 2007/0002081 | A1 | 1/2007 | Sakata |
| 2008/0136975 | A1 | 6/2008 | Nishida |
| 2008/0266321 | A1 | 10/2008 | Aufranc |
| 2008/0278807 | A1 | 11/2008 | Richards |
| 2008/0284921 | A1 | 11/2008 | Hirata |
| 2008/0309884 | A1 | 12/2008 | O'Dor |
| 2009/0086296 | A1 | 4/2009 | Renaud-Goud |
| 2009/0087092 | A1 | 4/2009 | Min |
| 2009/0109349 | A1 | 4/2009 | Kanai |
| 2009/0147153 | A1 | 6/2009 | Hasegawa |
| 2009/0161028 | A1 | 6/2009 | Tanaka |
| 2009/0257031 | A1 | 10/2009 | Carroll |
| 2010/0014134 | A1 | 1/2010 | Cable |
| 2010/0253599 | A1 | 10/2010 | Szczerba |
| 2011/0002019 | A1 | 1/2011 | Routley |
| 2011/0149018 | A1 | 6/2011 | Kroll |
| 2012/0092360 | A1 | 4/2012 | Kang |
| 2021/0181677 | A1 * | 6/2021 | Kim .................... G03H 1/2294 |

FOREIGN PATENT DOCUMENTS

| | | |
|---|---|---|
| CN | 101371594 | 2/2009 |
| CN | 101976031 | 2/2011 |
| CN | 101421669 | 5/2013 |
| DE | 4300726 | 7/1994 |
| GB | 2249164 | 4/1992 |
| GB | 2342466 | 4/2000 |
| GB | 2438472 | 11/2007 |
| GB | 2455523 | 6/2009 |
| JP | 05216119 | 8/1993 |
| JP | 06109992 | 4/1994 |
| JP | 06511328 | 12/1994 |
| JP | 2000184317 | 6/2000 |
| JP | 2002214697 | 7/2002 |
| JP | 2003125317 | 4/2003 |
| JP | 2003524962 | 8/2003 |
| JP | 2004023460 | 1/2004 |
| JP | 2004077865 | 3/2004 |
| JP | 2004191943 | 7/2004 |
| JP | 2005091610 | 4/2005 |
| JP | 2005167680 | 6/2005 |
| JP | 2005216119 | 8/2005 |
| JP | 2005221629 | 8/2005 |
| JP | 20060071681 | 3/2006 |
| JP | 2006109168 | 4/2006 |
| JP | 2006258859 | 9/2006 |
| JP | 2007072443 | 3/2007 |
| JP | 2008118001 | 5/2008 |
| JP | 2009037259 | 2/2009 |
| JP | 2009109975 | 5/2009 |
| JP | 2009520998 | 5/2009 |
| JP | 2009520998 A | 5/2009 |
| JP | 2009145369 | 7/2009 |
| JP | 2009535654 | 10/2009 |
| JP | 2010049236 | 3/2010 |
| JP | 2010507826 | 3/2010 |
| JP | 2010524038 | 7/2010 |
| JP | 2011033805 | 2/2011 |
| JP | 2011508911 | 3/2011 |
| JP | 2012141725 | 7/2012 |
| KR | 1020080005580 | 1/2008 |
| KR | 101029920 | 4/2011 |
| RU | 2113066 | 6/1998 |
| RU | 2332810 | 8/2008 |
| WO | 03077013 | 9/2003 |
| WO | 2006116536 | 11/2006 |
| WO | WO-2008110779 A1 * | 9/2008 ............ G06E 3/003 |
| WO | 2008140787 | 11/2008 |
| WO | 2010027245 | 3/2010 |
| WO | 2010053958 | 5/2010 |
| WO | 2010125367 | 11/2010 |
| WO | 2011134834 | 11/2011 |

OTHER PUBLICATIONS

Genesis Series raster/calligraphic projectors, Mar. 2005.
Hoskinson, R. et al, "Light Reallocation for High Contrast Projection Using an Analog Micromirror Array," ACM Transactions on Graphics, 2010.

* cited by examiner

HIGH LUMINANCE PROJECTION DISPLAYS AND ASSOCIATED METHODS

CROSS-REFERENCE TO RELATED APPLICATIONS

This application is a Continuation of U.S. patent application Ser. No. 15/147,238 filed May 5, 2016 which is a Continuation of U.S. patent application Ser. No. 14/112,347 filed Oct. 17, 2013 which is a national stage application of International Patent Application No. PCT/U2012/032995 filed Apr. 11, 2012, which claims priority to U.S. Provisional Application No. 61/476,949 filed Apr. 19, 2011, which are hereby incorporated by reference in their entirety for all purposes.

TECHNICAL FIELD

The invention relates to projection displays. An example embodiment provides a digital cinema display. Other embodiments provide displays such as televisions, computer displays, and special purpose displays such as advertising displays, virtual reality displays, game displays, and medical imaging displays.

BACKGROUND

There is an increasing interest in providing displays that are capable of reproducing realistic-looking images. One aspect of achieving realistic images is providing high peak luminance and high dynamic range. A typical natural scene includes areas that are very bright, for example the sun in the sky and highlights of brightly illuminated objects, as well as areas that are dim, for example objects in the shadows. Achieving realistic images of general scenes is not possible on displays that are incapable of high peak luminance.

Current projection technology does not scale efficiently to high luminance. For example, in many common projector designs, a light source, such as a xenon lamp, illuminates one or more spatial light modulators. The spatial light modulators direct some light to the screen while absorbing or redirecting other light. Achieving high luminance requires scaling up the power of the light source. The increasing power consumption of the light source becomes an obstacle to increasing the brightness of the light source to levels sufficient to provide peak luminance at a level typical of natural scenes. Moreover, a powerful light source can cause problems with overheating spatial light modulators and other components in the projector, among other issues.

As an example, a current digital cinema projector may have a light source that consumes 8 kilowatts of electrical power to illuminate a large screen producing a peak luminance of 48 nits (48 cd/m$^2$). In order to achieve a peak luminance of 12,000 nits (a luminance commonly encountered in everyday life), the power of the light source would need to be scaled to over 2 megawatts. This is clearly impractical in most cases.

A further problem which prevents significant increases in the peak luminance of many conventional projection displays is that the contrast does not increase with peak luminance. In many such displays, increasing the intensity of the light source to achieve an increased peak luminance also raises the black level. Therefore, attempts to increase the peak luminance past a threshold will result in an unacceptably high black level.

A further obstacle to providing displays having high enough luminance to present realistic images is that the response of the human visual system to light is roughly logarithmic. By contrast, power requirements scale roughly linearly with luminance. Doubling the luminance of an image, assuming the same efficiency of the light source, requires doubling the power. However, doubling the luminance does not result in an image which will be perceived by a viewer as being twice as bright. Doubling the apparent brightness requires approximately squaring the luminance.

The foregoing examples of the related art and limitations related thereto are intended to be illustrative and not exclusive. Other limitations of the related art will become apparent to those of skill in the art upon a reading of the specification and a study of the drawings.

SUMMARY

This invention has a range of aspects. Embodiments of the invention provide projection displays, methods for operating projection displays, dual-modulation displays, media containing computer-readable instructions which, when executed by a data processor, cause the data processor to execute a method according to the invention, methods for displaying images, and methods for processing image data for display, among others.

One example aspect of the invention provides a display system comprising: a main projector arranged to project an image defined by base image data onto a screen and a highlight projector arranged to project a highlight image defined by highlight image data onto the screen in registration with the base image. An image processor is configured to process image data to generate the highlight image data.

In some embodiments, the highlight projector comprises a scanning beam projector. The scanning beam projector may provide, for example, laser beams of a plurality of primary colours (for example, red, green, and blue beams). The beams may be scanned together or independently to cause the highlight areas to have desired apparent brightness and colours. In other embodiments the scanning beam projector provides a scannable beam of white light.

In some embodiments the highlight projector comprises a 2D holographic projector.

Another aspect provides a highlight projector system comprising an image processor configured to process image data to yield a highlight image; and a light projector operable to project light according to the highlight image in registration with a base image.

Another example aspect provides a display comprising a light source of spatially-modulated light arranged to illuminate a spatial light modulator wherein the source of spatially modulated light comprises a 2D holographic light source.

Another example aspect provides a method for displaying an image defined by image data. The method comprises concentrating light from a light source to yield light that has been spatially-modulated in a manner based on the image data; illuminating a spatial light modulator with the spatially-modulated light; and controlling the spatial light modulator to display an image according to the image data. Concentrating the light may comprise generating a computer-generated 2D hologram, for example. In some embodiments, the light comprises coherent light and concentrating the light comprises adjusting phases of the light in the Fourier plane of an optical system.

Another example aspect provides a method for displaying an image according to image data. The method comprises processing the image data to generate a base image and a highlight image comprising highlight pixels; operating a main projector to display the base image; and operating the highlight projector to display the highlight image superposed with the base image.

In addition to the exemplary aspects and embodiments described above, further aspects and embodiments will become apparent by reference to the drawings and by study of the following detailed descriptions.

BRIEF DESCRIPTION OF DRAWINGS

The accompanying drawings illustrate non-limiting embodiments of the invention.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Some embodiments of the invention provide projection displays including a main projector and a highlight projector. The main projector may have a relatively low peak luminance and may be used to project a full image. The luminance of highlights in the image projected by the main projector is lower than desired. The highlight projector may project concentrated light to boost luminance at the location(s) of highlights, thereby boosting the luminance of highlights significantly.

Figure 1:
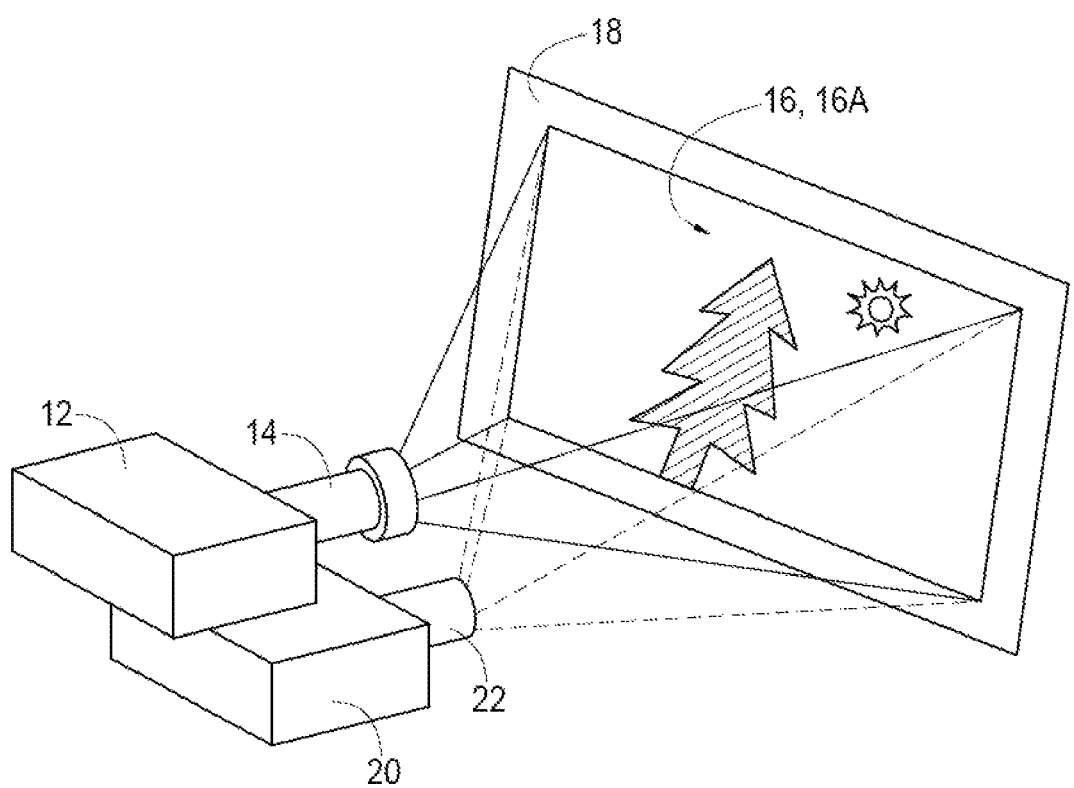
FIG. 1 is a schematic view of a display system according to an example embodiment.

FIG. 1 shows a projection system 10 according to a first example embodiment. Projection system 10 includes a main projector 12 having a lens 14 that projects an image 16 onto a screen 18. Screen 18 may be a front-projection screen or a rear-projection screen. System 10 further includes a separate highlight projector 20 having a lens 22 which projects an image 16A onto screen 18. Images 16 and 16A are superposed so that a viewer sees an image resulting from the combination of images 16 and 16A.

Main projector 12 may comprise any suitable image projector. For example, main projector 12 may comprise a DLP-based projector, a projector which uses one or more liquid crystal on silicon (LCOS) spatial light modulators, a projector comprising a transmissive liquid crystal display (LCD) panel to modulate light, a cathode ray tube (CRT) projector or the like.

Highlight projector 20 is of a type which can deliver concentrated light to at least some areas within the area of image 16, preferably without significantly raising the light level in other areas within image 16. For example, highlight projector 20 may comprise one or more scanning beams which can be directed to add further illumination to only selected highlight areas of image 16.

Highlight projector 20 and main projector 12 are co-registered so that highlight projector 20 can accurately deliver additional light to small highlight areas within the image 16 projected by main projector 12. In some embodiments highlight projector 20 has a spatial resolution equal to or greater than that of main projector 12. In other embodiments, projector 20 can have a spatial resolution less than main projector 12. In other embodiments, projector 20 can have a spatial resolution less than main projector 12.

In some embodiments, highlight projector 20 and an image processor are provided for use as an add-on to an existing main projector such as a commercially-available digital cinema projector. The image processor may be configured to receive image data for projection and generate a highlight image for display by the highlight projector. The image processor may, in some embodiments, modify the image data to provide a base image for display by the existing main projector. The highlight projector may be calibrated upon installation to produce highlight images that are registered with images produced by the existing main projector.

Figure 2A:
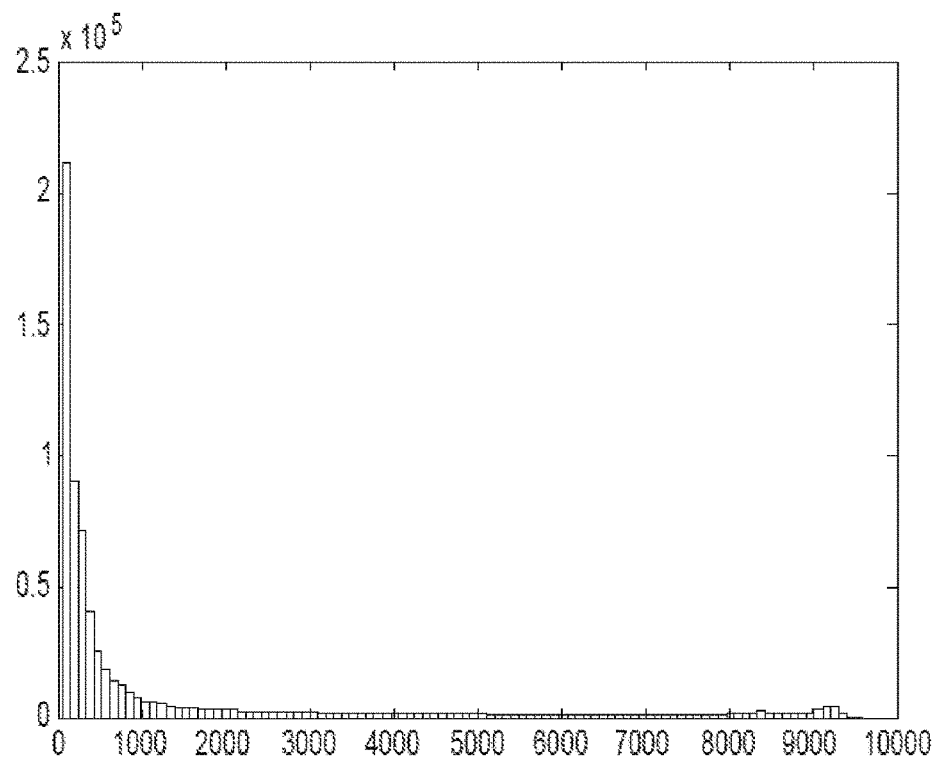
FIGS. 2A and 2B are exemplary histograms showing the number of pixels in an image as a function of the luminance of those pixels for, respectively, a bright image and a dark image.
Figure 2B:
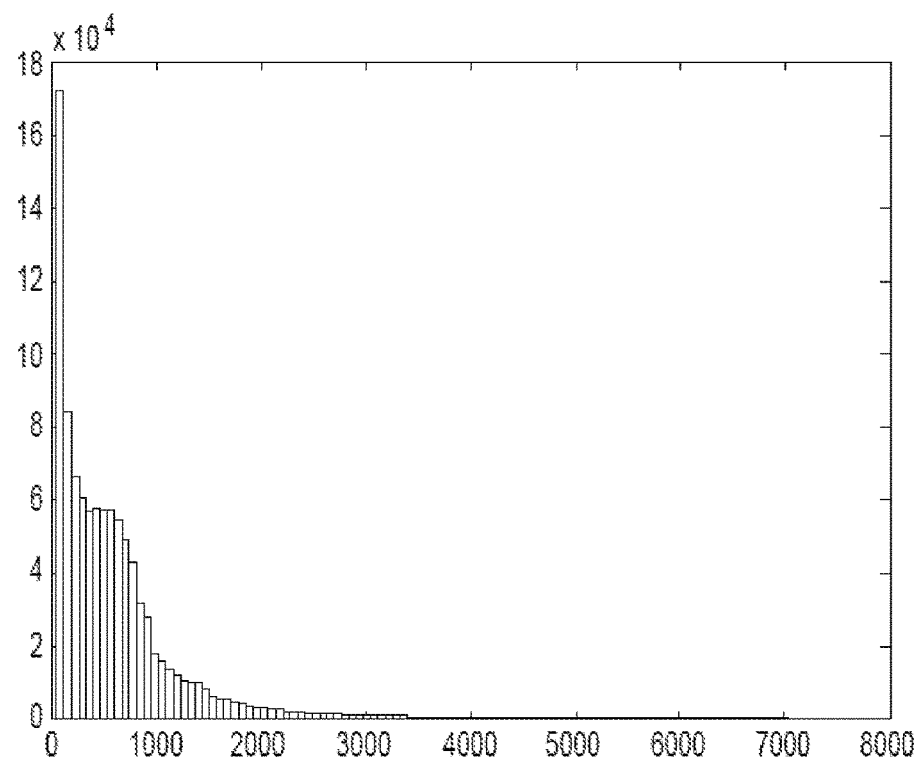

Advantageously, in typical scenes, only a relatively very small proportion of the pixels in an image need to be displayed with a luminance greater than the peak luminance of standard projector 12 for enhanced realism. It has been found that enhanced realism can be achieved by providing bright highlights very selectively. FIGS. 2A and 2B are histograms showing the number of pixels in an image as a function of the luminance of those pixels for, respectively, a bright image and a dark image prepared by a human colorist for viewing on a display having a high peak luminance. In each case the colorist adjusted the image for what the colorist considered to be optimum appearance.

Somewhat surprisingly, the average brightness of all pixels in the bright image is still relatively very low. Even in the bright image having the histogram of FIG. 3, it can be seen that only a relatively very small proportion of the pixels have high luminances (e.g. luminances over about 1,000 or 2,000 nits). The few very bright pixels at high and very high luminances can result in the image having a much more realistic appearance without significantly affecting the light adaptation of a viewer's eyes. This differs from real scenes from nature in which many or all pixels may have very high luminance. For example, a real scene on a glacier on a sunny day may be so bright that it is uncomfortable or even harmful to view for extended periods without dark sunglasses. A colorist may prepare such a scene in a way which results in a relatively low average luminance while providing high luminance in a few key areas to provide a more realistic viewing experience.

Some embodiments exploit the fact that even very bright scenes may be rendered at a surprisingly low average luminance while preserving a realistic viewing impression if small highlight areas are presented with a peak luminance that is much higher than the average luminance with which the image is presented to viewers. Some embodiments use a highlight projector that is much too low in power to raise all pixels of image 16 to the level of the brightest highlights but is capable of boosting illumination of the highlights to the desired level. In such embodiments, light from the highlight projector is concentrated into the highlights to provide desired brightness in the highlights.

There is a wide variety of ways to arrange a main projector and highlight projector in combination. For example, systems providing a main projector and a highlight projector for selectively boosting luminance of highlight areas may be provided which are arranged to have any combination of the following features:

- The main projector and the highlight projector may use the same overall technologies or different technologies.
- The main projector and highlight projector may be provided in the form of separate units or in the form of a combined unit (e.g., integrated form factor). Where the main projector and highlight projector are provided in the form of a combined unit the main projector and highlight projector may share certain optical components and/or certain optical paths. For example, the main projector and highlight projector may share one or more of a projection lens, relay optics, one or more spatial light modulators or the like. Various examples of shared components and optical paths are set out below.
- A system may comprise one or more than one main projectors that collectively project a base image. For example, system 10 may comprise a plurality of main projectors 12 that collectively illuminate screen 18 to provide image 16.
- A system may comprise one or more than one highlight projectors that can collectively project a highlight image to boost illumination of highlight areas. For example, highlight projector 20 may comprise a plurality of units that can be controlled to collectively direct light onto highlight areas of image 16.
- A highlight projector may be monochrome (e.g. may project white light) or polychromatic.
- A highlight projector may optionally include filtration (such as for example a spatial filter in a Fourier plane) to suppress illumination outside of highlight areas.
- A highlight projector may optionally comprise one or more spatial light modulators. The spatial light modulator(s) may be controlled to perform one or more of: direct light to illuminate highlight areas, correcting errors in a projected highlight image, suppress illumination outside of highlight areas, adjust a highlight image to blend smoothly into a base image projected by a main projector, and redirect light from outside of highlight areas into highlight areas. In embodiments in which the highlight projector includes one or more spatial light modulators, the spatial light modulator(s) may comprise spatial light modulator(s) shared by the main projector and/or may comprise spatial light modulator(s) dedicated to the highlight projector.
- The main projector and highlight projector may be arranged for front-projection or rear-projection. It is not mandatory that highlight projector 20 and main projector 12 illuminate screen 18 from the same side. In embodiments where screen 18 is translucent (e.g. where screen 18 comprises a rear-projection type of screen) highlight projector 20 and main projector 12 may illuminate screen 18 from opposite sides.

These different approaches and their permutations and combinations are not limiting but are intended to provide examples of some embodiments within the ambit of the invention.

Advantageously, the combined image, as viewed by a viewer includes some highlights in which the peak luminance significantly exceeds the peak luminance of main projector 12. For example, the main projector may have a peak luminance of 500 nits or less while the highlight areas may have a peak luminance of 2000 nits or more. Some main projectors intended for use in dark viewing environments (e.g. movie theaters) may provide peak luminance of 15 to 50 nits or so, for example. Some such projectors are designed to image onto large-area screens. Some main projectors intended for use in bright viewing environments may provide peak luminance of 100 to 300 nits or so, for example.

Since the highlight areas illuminated by highlight projector 20 may comprise only a very small fraction (e.g., less than 10%, 5%, 1%, or even less than 0.1%) of the area of image 16, highlight projector 20 may be able to achieve the desired high luminance in highlight areas without requiring an impractical power input.

Figure 1A:
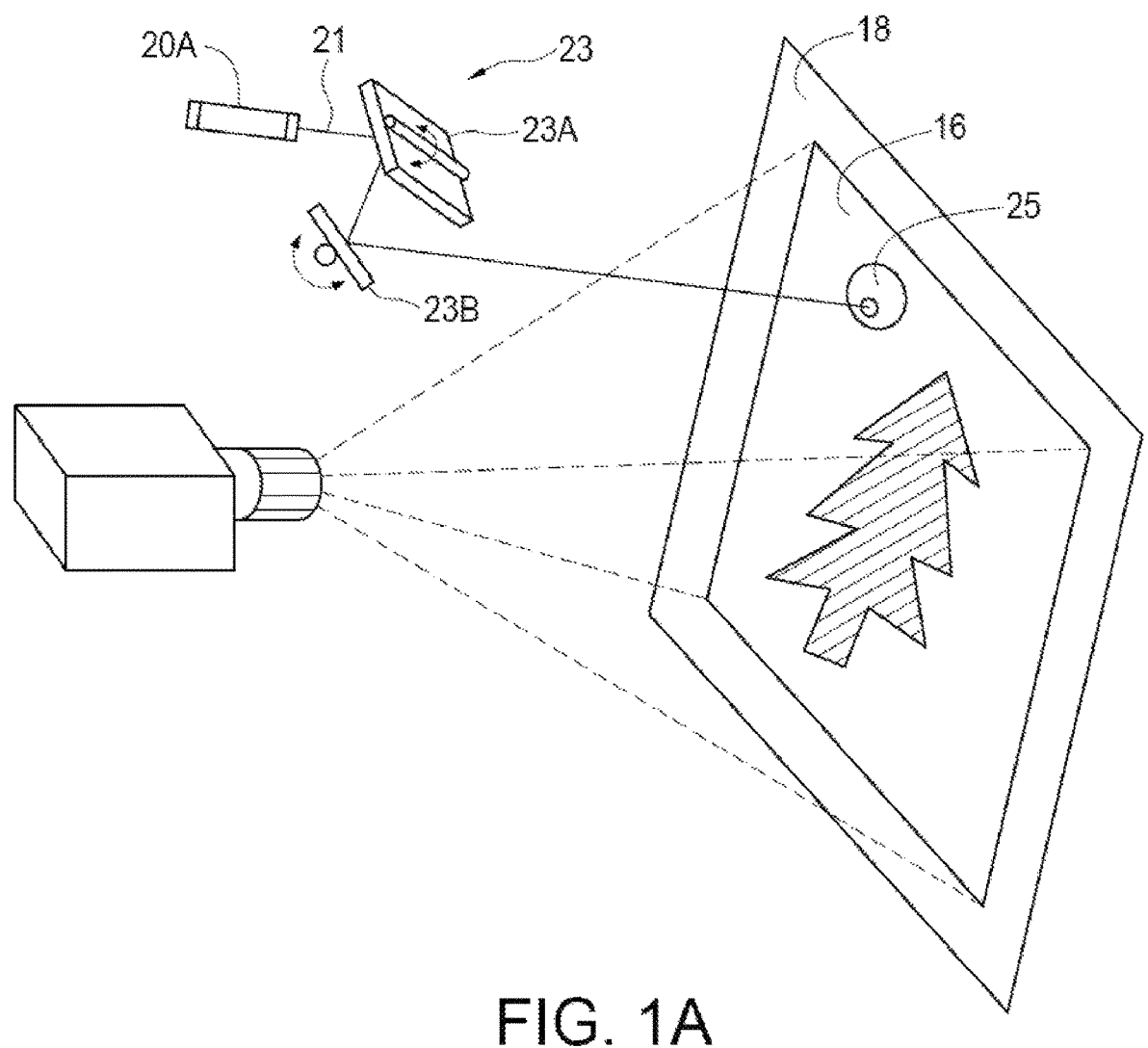
FIG. 1A is a schematic view of a display system according to another example embodiment.

FIG. 1A shows a projector system according to an example embodiment in which a highlight projector comprises a spot light source 20A which produces narrow beam 21 of light and a deflector 23 comprising scanning mirrors 23A and 23B. Mirrors 23A and 23B are pivotally mounted and operated by actuators (not shown) such that light beam 21 can be guided to form a small spot 25 at any desired location in image 16. The intensity of light beam 21 and the locations at which spot 25 is displayed may be controlled by a controller to achieve increased luminance in selected highlight areas. In some embodiments, brightness of a highlight area is controlled at least in part by varying the amount of time that spot 25 is controlled to dwell on the highlight area. In some embodiments, brightness of a highlight area is controlled at least in part by controlling the intensity and/or duty cycle of beam 21 while the beam 21 is illuminating the highlight area.

Beam 21 may, for example, comprise a laser beam. In some embodiments the highlight projector comprises three laser beams of different colors that can be combined to make white highlights. For example the highlight projector may comprise red, green and blue laser beams. In such embodiments the beams may be steered to illuminate highlight areas by a single deflector assembly (e.g. a single set of mirrors 23A, 23B). In alternative embodiments a separate deflection assembly is provided for each of a plurality of beams 21.

Since highlights only appear typically in a small proportion of the overall area of an image 16, the laser may increase the perceived brightness of highlight areas by dwelling longer in those areas. The laser need not illuminate any parts of image 16 outside of the highlight areas.

In embodiments in which the highlight projector comprises a steerable light beam, a controller which steers the light beam may be configured to control mirrors 23A and 23B (or an alternative beam-steering mechanism such as a mechanism using digital light deflectors, grating light valves or the like) to cause spot 25 to follow a trajectory that is dependent on the locations of highlight areas to be illuminated. It is not necessary for the beam steering mechanism to scan in a raster or other pattern that covers all pixels of image 16. By steering spot 25 in a trajectory that takes spot 25 to highlight areas while avoiding at least some pixels that are outside of highlight areas, controller 25 can cause spot 25 to dwell on the highlight areas for periods sufficient to achieve a desired luminance of the highlight areas.

Figure 3:
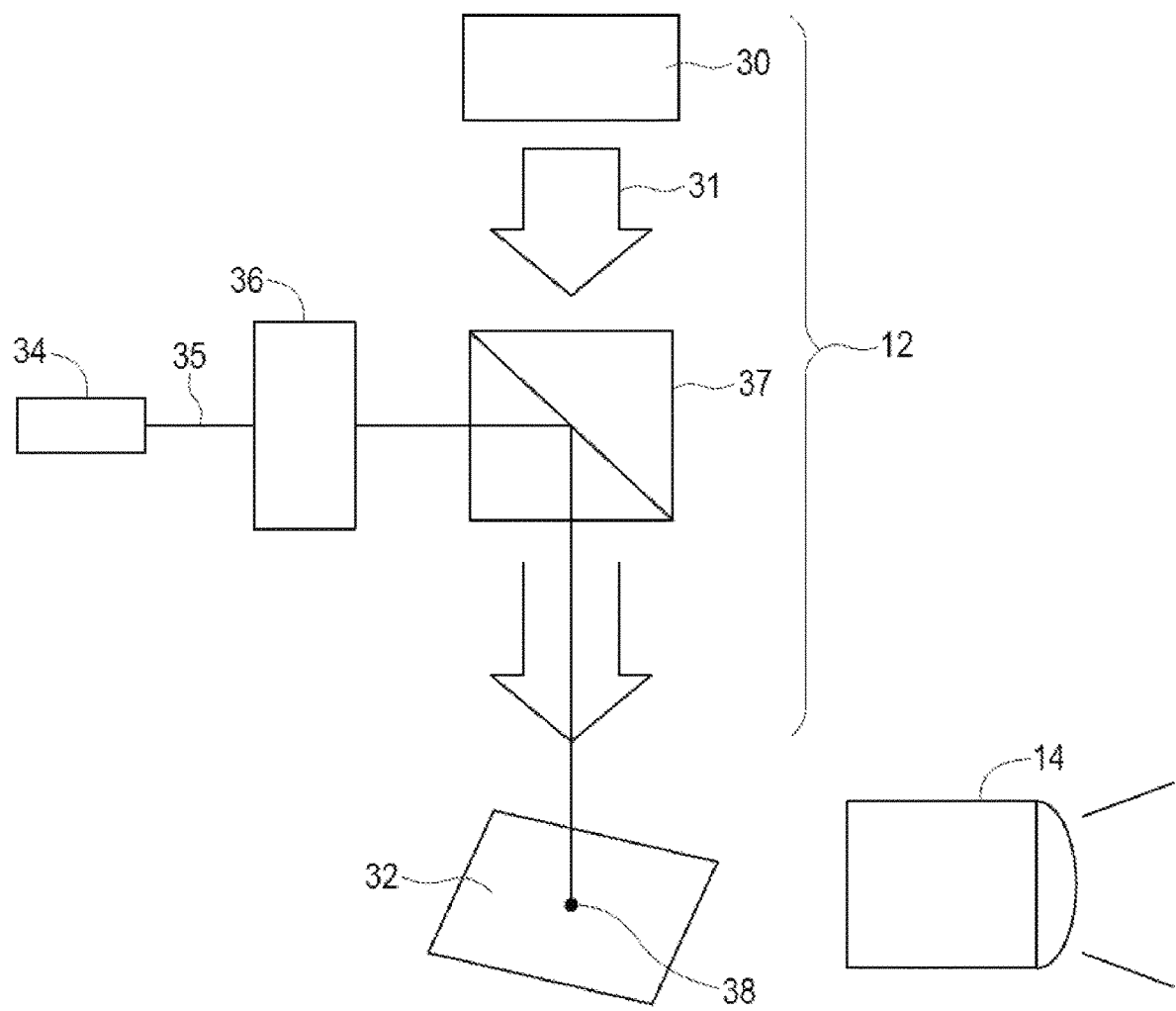
FIG. 3 is a schematic illustration of an example apparatus that combines a highlight projector with a main projector.

Main projector 12 and highlight projector 20 may optionally be integrated with one another such that the two projectors share some common optical paths. For example, the optical systems of highlight projector 20 and main projector 12 may be arranged to share a common projection lens 14. One example of this is illustrated in FIG. 3. FIG. 3 is schematic in nature. Optical components that may be present in the optical paths such as relay lenses, mirrors, filters or the like have been omitted for clarity.

In the embodiment illustrated in FIG. 3, main projector 12 comprises a light source 30 which can emit light 31 to illuminate a spatial light modulator 32. Light source 30 may comprise a uniform light source or a light source that can be spatially modulated in accordance with image data (for example a base image). Light modulated by spatial light modulator 32 is directed by projection lens 14 onto screen 18 (not shown in FIG. 3) to provide image 16 (not shown in FIG. 3).

In this embodiment, the highlight projector comprises a high-intensity narrow beam light source 34 that can be controlled to emit a narrow beam of light 35 that is steered by a X-Y deflector 36 and optical combiner 37 to produce a brightly illuminated spot 38 on spatial light modulator 32. By controlling the intensity and/or turning on or off light source 34 while scanning with X-Y scanner 36, a plurality of different highlight areas may be illuminated on spatial light modulator 32 with light from light source 34. This additional light, as modulated by spatial light modulator 32, is also imaged by lens 14 to add to the luminance of highlight areas within image 16.

In an alternative embodiment, optical combiner 37 is located between spatial light modulator 32 and projection lens 14 such that spot 38 is projected directly onto a screen 18. In this alternative embodiment the optical paths of the main and highlight projectors may have only projection lens 14 in common.

Figure 4:
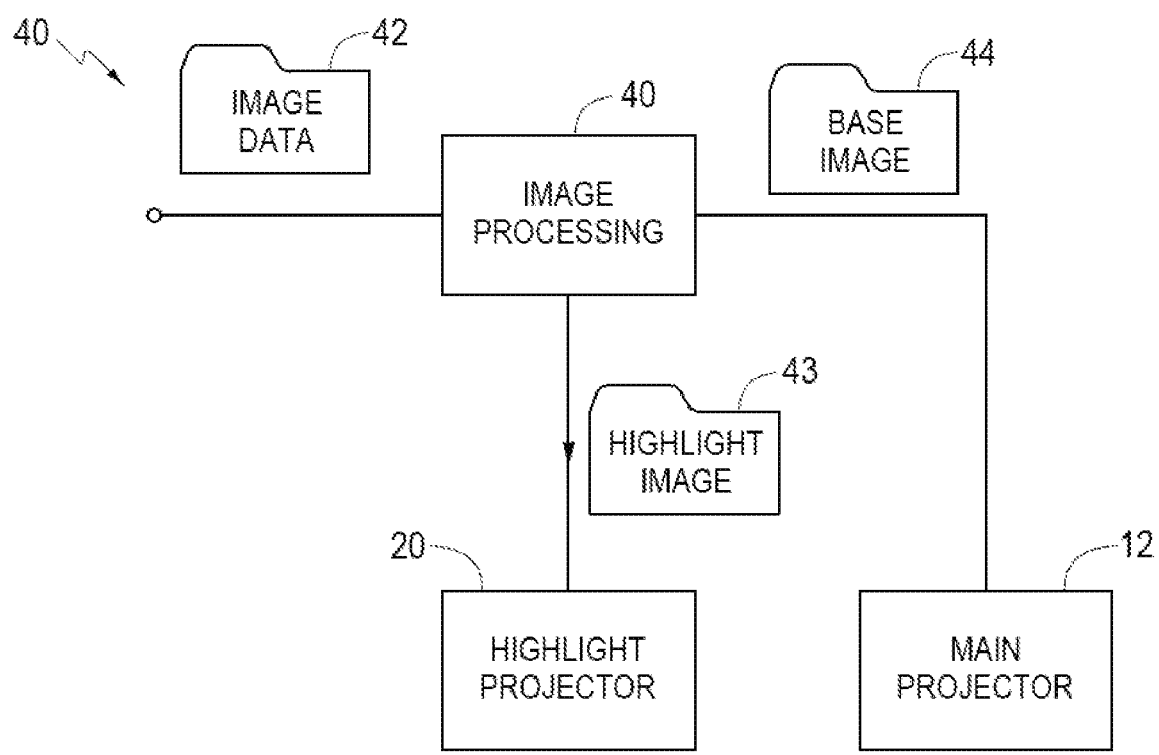
FIG. 4 is a block diagram illustrating image data processing components of a display system according to an example embodiment.

FIG. 4 is a block diagram illustrating image data processing components of a display system according to an example embodiment. An image processing system 40 receives image data 42 and processes image data 42 to identify highlight areas. Processing may comprise, for example, comparing pixel luminance values to a first threshold and identifying as belonging to highlight areas those pixels having luminance values in excess of the first threshold. In some embodiments highlight areas may be limited to areas comprising a predetermined area of connected pixels having luminance values exceeding the first threshold. As another example, processing may identify highlight areas as being made up of the M highest-luminance pixels (where M is a number) or those pixels that are at or above the Nth percentile for luminance (where N is a percentile such as the 90$^{th}$ percentile or 95$^{th}$ percentile or 98$^{th}$ percentile or 99$^{th}$ percentile or 99.9$^{th}$ percentile). Processing may comprise applying a plurality of such criteria (for example, highlight areas may be identified as the up-to M pixels for which luminance exceeds a threshold).

In some embodiments, processing comprises trading off peak luminance against area included in highlight areas. Such processing may comprise histogram analysis. For example, for an image in which processing identifies a relatively large number of pixels as belonging to highlight areas according to a first criterion, the processing may select between retaining the highlight areas according to the first criterion at the cost of reduced peak luminance achievable in the highlight areas or applying a second criterion to reduce the number of pixels included in highlight areas. Such processing may comprise histogram analysis.

In some embodiments, processing is performed with reference to an adaptation point. The adaptation point may, for example, comprise or be determined from a logarithmic mean luminance of the image. In the case of video images the adaptation-point may comprise a temporal average over some previous images. In such embodiments, processing to identify highlight areas may comprise identifying pixels that have luminance higher than the adaptation point by at least a threshold amount.

Image processing system 40 generates a highlight image 43 which is delivered to highlight projector 20. Highlight image 43 is displayed by highlight projector 20 to provide increased brightness in highlight areas. Pixels outside of the highlight areas may have very small or zero values in highlight image 43. Image processing system 40 also delivers a base image 44 for projection by main projector 12.

In some embodiments, base image 44 is the same as image data 42. In other embodiments, base image 44 is processed to provide a smooth transition between highlighted areas which are illuminated primarily by highlight projector 20 and base areas of image 16 which are illuminated primarily or entirely by main projector 12. This processing may comprise, for example extracting highlight components from image data 42 to provide base image 44. In some embodiments the processing comprises estimating the luminance that will be delivered to image pixels by highlight projector 20 when driven to display highlight image 43 and compensating for that estimated luminance in generating base image 44. In some embodiments the estimation may model properties of the optical system of highlight projector 20. In some embodiments the estimation may estimate light delivered by highlight projector 20 to pixels outside of highlight areas. Colour and luminance of main projector 12 and highlight projector 20 may be calibrated to facilitate such smooth transitions.

Highlight image 43 may take a variety of forms. In some embodiments, highlight image 43 may comprise or be treated as a binary image (all pixels that are "ON" being set to the same level). Such embodiments may be used, for example, in combination with a process for selecting highlight areas that selects highlight areas as being made up of pixels that have luminances well above the adaptation point. Such embodiments may exploit the fact that the human visual system responds similarly to light that is well above the adaptation point. For example, a viewer may not be able to tell much or any difference between an image in which certain highlight pixels have luminance of 10000 nits and another image in which the same highlight pixels have luminance of 15000 nits as long as the highlight pixels have luminances well above the adaptation point in both images. Some such embodiments may operate by distributing luminance from a highlight projector equally over highlight pixels and/or by clipping the luminance of the highlight pixels to a set level.

In other embodiments the highlight projector may be controlled to supply different luminances to different highlight pixels or areas. In yet other embodiments the highlight projector may be controlled according to a combination of approaches. For example, the highlight processor may be controlled to supply different luminances to highlight pixels for which the image data specifies luminance in a first range and to supply the same luminance to highlight pixels for which the image data specifies luminance above the top of the first range. The first range may be fixed or may vary. For example, a variable first range may be based on a current adaptation point, on a number of pixels identified as being in highlight areas, on statistics of pixels identified as being in highlight areas (e.g. maximum, mean, average, or the like of the highlight pixels) on combinations of these and the like.

Image data processing may be distributed in various manners. For example, in some embodiments, an image processing system 40 is integrated with a highlight projector such that image data 42 is provided directly to the highlight projector which derives highlight image 43 internally. In some alternative embodiments, processing is performed upstream such that highlight image data 43 is supplied together with base image data 44. For example, highlight image data 43 may be encoded together with base image data 44 in a stream, file or other data structure. In such embodiments a projector system may be configured to extract the highlight image data 43 and to control a highlight projector using the base image data 43 while causing a main projector to display images according to base image data 44.

A highlight projector may take many different forms. Some examples of different technologies that may be used for a highlight projector include: scanning spot projectors (some example embodiments of such projectors are described above); holographic projectors (e.g. projectors which phase modulate light in the Fourier plane of an optical system and thereby concentrate light to form images on an image surface).

An alternative type of scanning projector comprises a 1D light modulator that produces a stripe of spatially-modulated light on screen 18 and a scanner that scans the stripe across screen 18. By way of non-limiting example, the 1D modulator may comprise a 1D polarization modulator in combination with a polarizing beam splitter and a scanning mirror.

Figure 5:
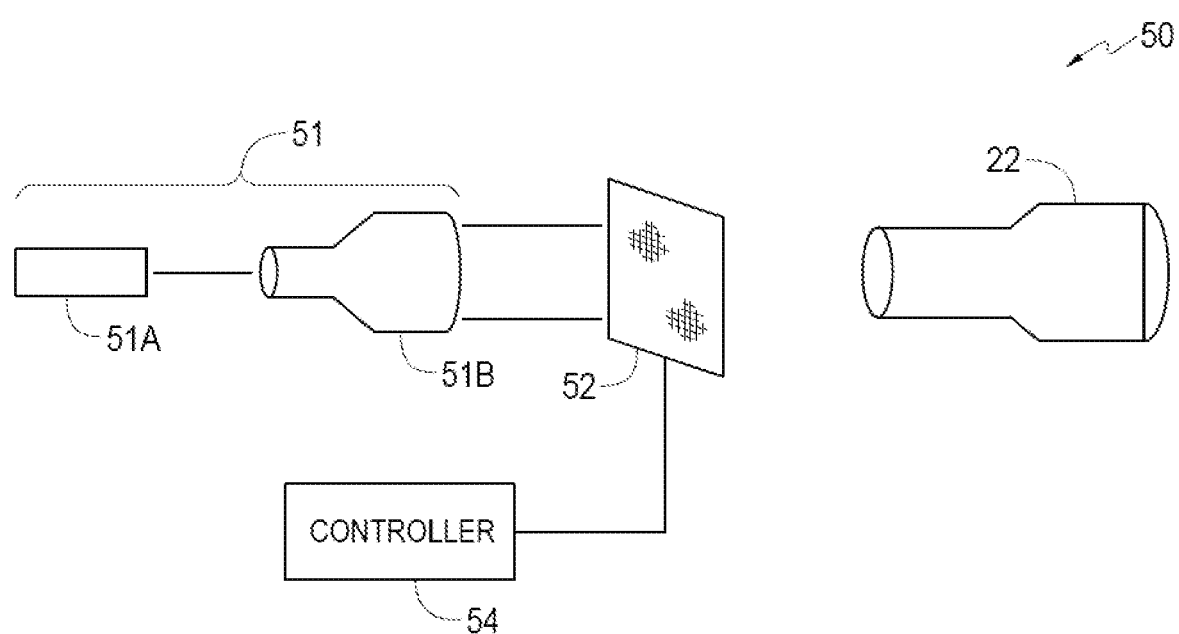
FIG. 5 is a schematic view illustrating a highlight projector comprising a light-redirecting projector according to an example embodiment. Highlight projectors of the type illustrated in FIG. 5 may be configured to project light onto a screen, a component of a main projector or a spatial light modulator, for example.

Another example embodiment is illustrated in FIG. 5. FIG. 5 shows schematically a highlight projector 50 comprising a light-redirecting projector. One general type of such projectors includes projectors which concentrate light in some areas to the exclusion of other areas by applying a diffraction-based/phase modulation approach. This approach is sometimes referred to as "holographic 2D projection".

In the embodiment illustrated in FIG. 5, the highlight projector comprises a coherent light source 51 (in the illustrated embodiment, light source 51 comprises a laser 51A and a beam expander 51B), a phase modulating panel 52 located in an optical Fourier plane in a light path of the projector, and a controller 54 which spatially varies the phase-shifting effect of phase modulator 52 according to the real component of the inverse Fourier transform of the desired highlight image. Controller 54 may be configured to determine a Fourier-based hologram (sometimes called a computer-generated hologram) corresponding to the highlight image and to set the phase at different locations on phase modulating panel 52 according to the computer generated hologram. The interaction of light from light source 51 with phase modulating panel 52 controlled according to the Fourier-based hologram produced by controller 54 results in a recreation of the highlight image. Lens 22 projects the resulting image onto screen 18 (not shown in FIG. 5).

In some embodiments a highlight projector comprises one or more holographic projectors having variable-intensity light sources. The intensity of the light source(s) may be controlled to provide further control over the display of the highlight image.

In some embodiments, a highlight projector comprises a plurality of holographic projectors which each project light of a different color. For example, one holographic projector may comprise a red light source 51 and be controlled to display a red channel of a highlight image. Such a projector may be used in combination with holographic projectors which comprise green and blue light sources and are respectively controlled to image green and blue channels of the highlight image.

Current projectors of the type which generate images by varying a phase modulator have the disadvantage that there can be significant leakage of light due to the finite resolution of the phase modulator and/or because the inverse Fourier transform of a desired image will, in general, have both real and imaginary parts and a typical phase modulator only implements one part of the inverse Fourier transform. Such light leakage may be partially or substantially entirely compensated for in highlight projectors in embodiments in which phase modulated light is imaged to illuminate a spatial light modulator (such as a DMD array, LCOS modulator, LCD panel or the like). In such embodiments the spatial modulator may be operated to clean up the projected highlight image by reducing the amount of light outside of highlight areas. The spatial modulator used for this purpose may be the same as or different from the spatial modulator used in a main projector.

Light leakage may be reduced by providing a phase modulator panel 52 having a high spatial resolution. In some embodiments, phase modulator panel 52 has a spatial resolution exceeding that of the highlight image. In some embodiments, the number of controllable elements of phase modulator panel 52 is 9 times or more larger than the number of pixels in the highlight image.

A holographic projector may optionally be configured to project a highlight image onto a non-planar focal surface. Controller 54 may be configured to generate drive signals for the phase modulator which result in focusing onto a desired non-planar surface. For example, the holograph may be configured to yield a focused image on a curved screen or spatial light modulator.

Figure 6A:
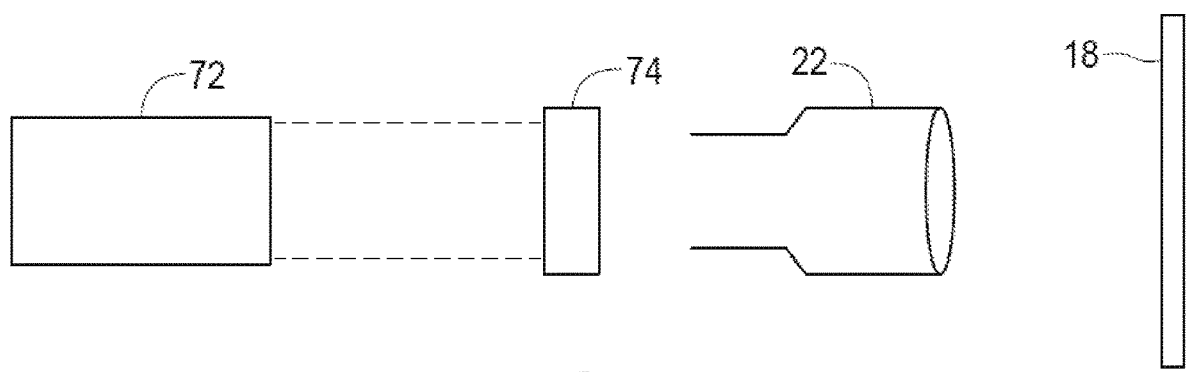
FIG. 6A is a schematic view illustrating an example holographic projector configured to project a desired highlight image onto a spatial light modulator which is controlled to either redirect, dump, or absorb light in image areas outside of the highlight areas.

In the embodiment illustrated in FIG. 6A, a holographic projector 72 projects a desired highlight image onto a spatial light modulator 74 which is controlled to either redirect or dump or absorb light in image areas outside of the highlight areas. Light from spatial light modulator 74 is then imaged onto a screen 18 for example by a projection lens 22. Spatial light modulator may, for example, be controlled by performing a simulation of the operation of holographic projector 72 to obtain an estimate of the actual distribution of light produced by holographic projector 72. This estimate may then be compared to the highlight image. The comparison may comprise, for example, determining a ratio or difference of the estimate and the highlight image. Spatial light modulator 74 may be controlled according to a result of the comparison to compensate for differences between the light pattern actually projected by holographic projector 72 and the desired highlight image. Computing the estimate may, for example be performed using a programmed data processor, hard-configured logic circuits and/or configurable logic circuits (e.g. field-programmable gate arrays (FPGA's). The computation may comprise estimating a phase-shifted light field produced by a phase modulator of holographic projector 72 and computing a Fourier transform of the estimated light field.

In some embodiments, the spreading of light outside of highlight areas is reduced by blocking a DC component in the Fourier plane.

Figure 6B:
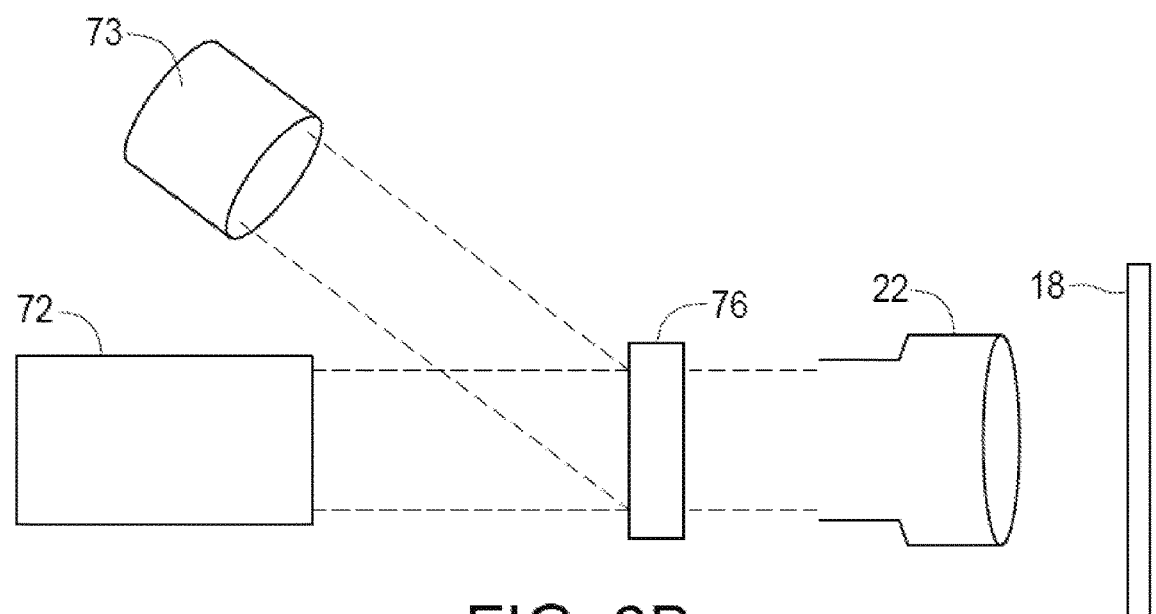
FIG. 6B is a schematic view illustrating a holographic projector configured to project a highlight image directly onto a spatial light modulator of a main projector according to an example embodiment.

In the example embodiment shown in FIG. 6B, holographic projector 72 projects a highlight image directly onto a spatial light modulator 76 of a main projector. Spatial light modulator 76 is also illuminated by light source 73.

Figure 7:
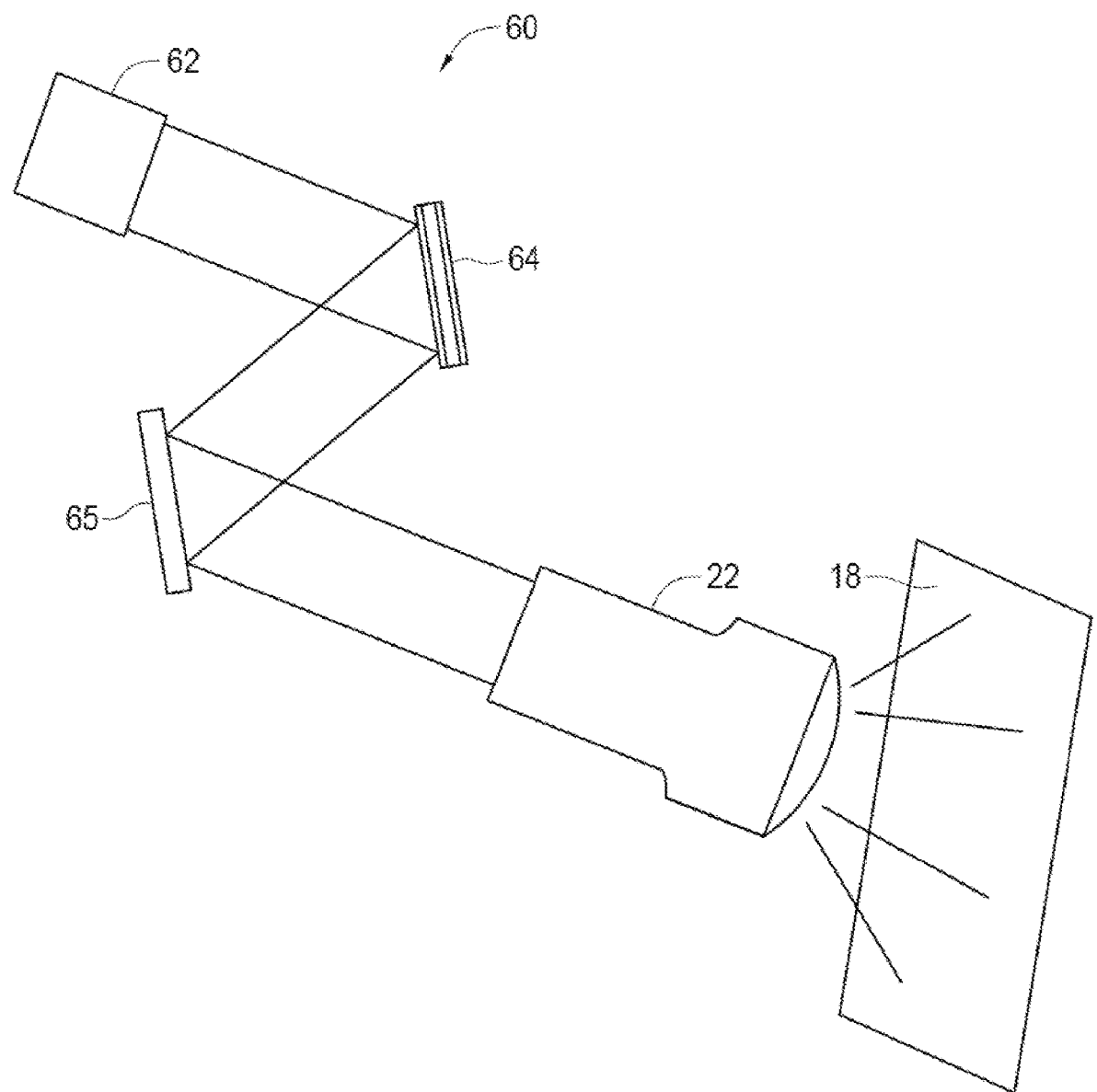
FIG. 7 is a schematic view illustrating a highlight projector comprising a light source arranged to illuminate a 2D spatial light modulator according to an example embodiment.

FIG. 7 shows schematically a projector 60 having an alternative architecture. Projector 60 comprises a light source 62 (which does not need to be a coherent light source). Light source 62 illuminates a 2D spatial light modulator 64 such as an analog DMD mirror array. Spatial light modulator 64 has controllable elements that can guide light to different positions on screen 18. In some embodiments, spatial light modulator 64 is directly imaged onto screen 18 by projection lens 66 to provide a highlight image. In some embodiments, spatial light modulator 64 illuminates another spatial light modulator 65. Spatial light modulator 65 may comprise a spatial light modulator also used by a main projector, for example (not shown in FIG. 7).

Figure 8:
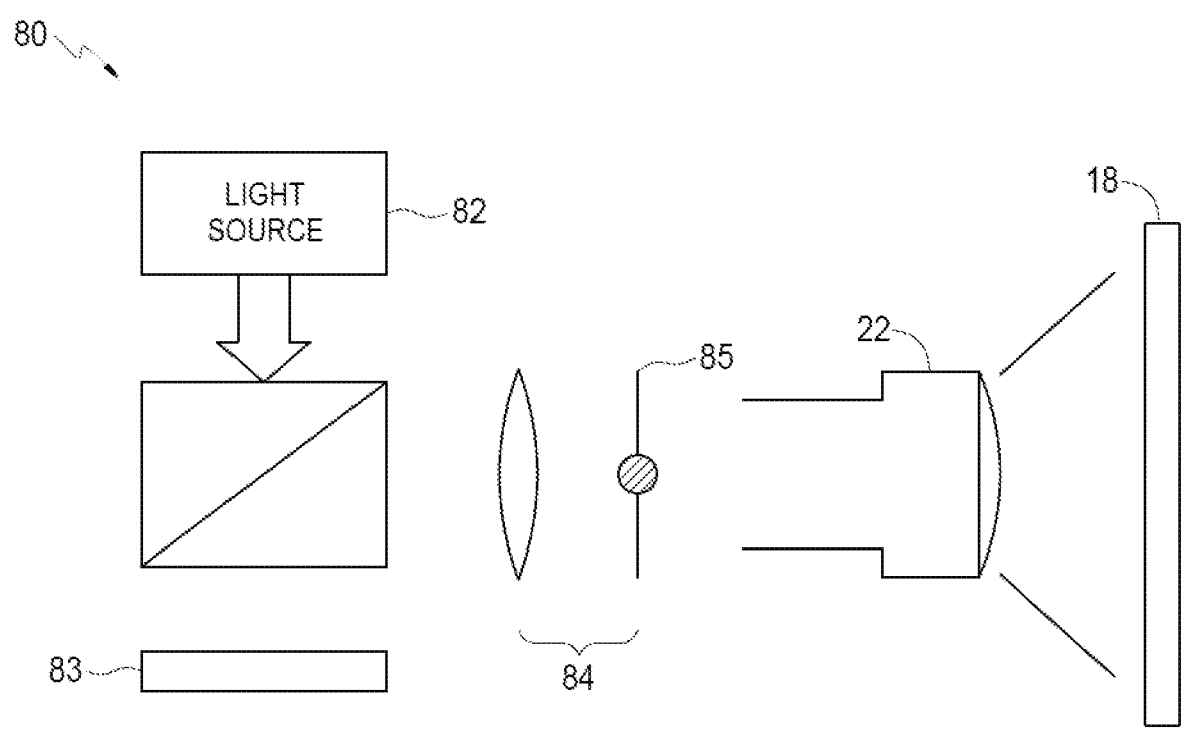
FIG. 8 is a schematic view illustrating a highlight projector comprising a light source that illuminates a spatial light modulator with a spatial filter in a Fourier plane for removing leakage light according to an example embodiment.

A highlight projector 80 according to a further alternative embodiment is illustrated in FIG. 8. Highlight projector 80 comprises a light source 82 that illuminates a spatial light modulator 83. In an example application, spatial light modulator 83 is controlled so that all pixels outside of highlight areas are set to not pass light to screen 18. Since spatial light modulator 83 is not perfect, some light is passed by pixels outside of the highlight areas. This leakage light may be perceived by viewers as a raising of the black level (e.g. blacks take on a grey appearance over the entire image). Highlight projector 80 includes a spatial filter 84 which, in the illustrated embodiment includes a mask 85 provided in a Fourier plane in the optical path between spatial light modulator 83 and screen 18. Mask 85 blocks the DC spatial frequency component (i.e. a component of the signal affecting all pixels in the displayed image) thereby decreasing the black level while still passing the highlights.

Systems in which a light source for a main projector or holographic projector comprises a source of coherent light may include one or more optical components configured to reduce the appearance of laser speckle in the projected images. Any suitable speckle-reduction technology may be applied. For example, a variety of techniques for reducing laser speckle are known in the art. These include techniques such as providing: a vibrating diffuser in an optical path; randomizing a phase of the coherent light source, and randomizing polarization of the coherent light source.

Highlight projectors as described herein may be applied to 3D projection systems as well as to 2D projection systems. In embodiments where viewers wear polarizing or spectrally sensitive glasses such that different components of the projected light are directed to the viewers' left and right eyes, a highlight projector may be controllable to emit light for viewing by viewers' left eyes, right eyes, or both eyes. In the alternative, separate highlight projectors may be provided to project highlight images for users' left and right eyes. In some embodiments the highlight projector(s) emit light having different spectral compositions for viewing by viewers' left and right eyes. For example, projection systems as described herein may be used in conjunction with 3D image projection systems as described, for example, in WO2008/140787; WO2011/002757; and U.S. Pat. No. 7,784,938; all of which are hereby incorporated herein by reference for all purposes.

Figure 9:
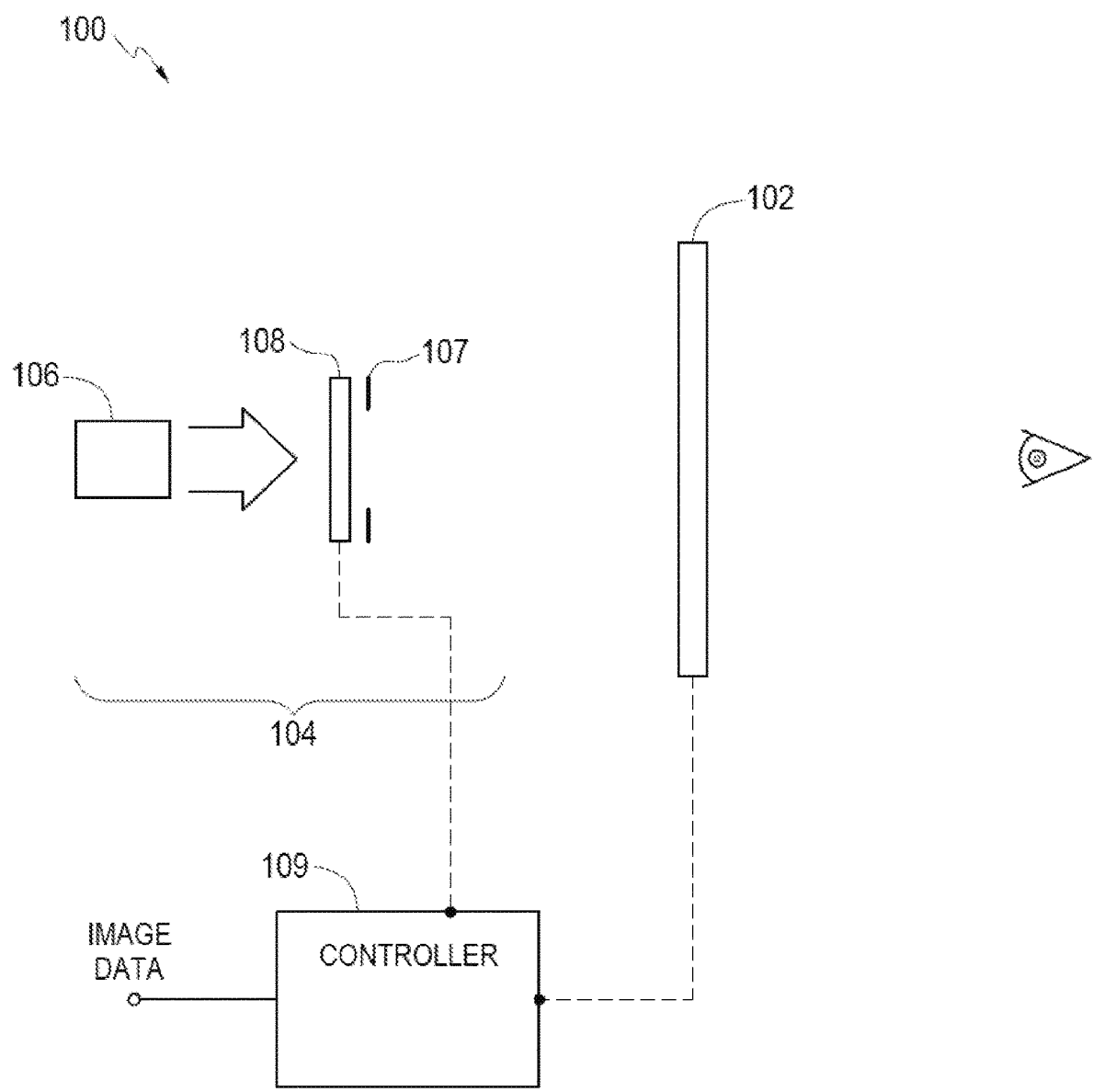
FIG. 9 shows a display according to another embodiment. Displays having the overall architecture illustrated schematically in FIG. 9 may be used as a stand-alone displays (e.g. as a television, computer monitor, special purpose display or the like) or as part of a display system that includes a highlight projector.

FIG. 9 shows a display 100 according to another embodiment. Display 100 may be, for example, a television, computer display, advertising display or the like. Display 100 may be used with or without a highlight projector. Display 100 comprises a spatial light modulator panel 102 illuminated by a backlight assembly 104. Spatial light modulator panel 102 may comprise a transmission-type light modulating panel such as a LCD panel, for example. Backlight assembly 104 comprises a holographic projector as described herein, for example. The holographic projector comprises a coherent light source 106, and a phase-modulating panel 108. Light from light source 106 is phase modulated by panel 108 and directed onto spatial light modulator panel 102.

A display controller 109 receives an image to be displayed, determines a desired backlight light distribution, and controls the holographic projector to project the desired backlight light distribution onto the spatial light modulator panel 102. The desired backlight light distribution may be slowly varying (i.e. comprised mainly of lower spatial frequencies). A mask 107 (which may be fixed or controllable) may optionally be provided in the Fourier plane to attenuate or eliminate Fourier components corresponding to higher spatial frequencies. Controller 109 may, for example, determine the desired backlight light distribution by low-pass spatial filtering the image data, applying a blur filter to the image data, and/or computing local averages or weighted averages of local groups of pixels in the image data or the like. Driving values for pixels of phase-modulating panel 108 may be determined by computing an inverse Fourier transform of the desired backlight light distribution.

In some embodiments, the controller computes an estimate of the actual light distribution at spatial light modulator panel 102. This estimate may be used in setting pixels of spatial light modulator panel 102 to provide an image according to the image data. For example, the value for a pixel of spatial light modulator panel 102 may be set by comparing the intensity of light estimated to be incident on the pixel from backlight 104 to the intensity of light that the image data specifies for the pixel and setting the pixel of the spatial light modulator panel to reduce the intensity of the incident light to the intensity specified by the image data. The comparison may comprise, for example, dividing the image data by the estimated incident light intensity.

Computing the estimated incident light intensity may comprise estimating how light-modulating panel 108 will affect light from light source 106 when driven by the driving signals established by the controller and using that information to compute a light field resulting from the application of the signals to phase-modulating panel 108. The light field at spatial light modulator 102 may then be estimated by computing a Fourier transform of the light field.

In some embodiments, display 100 comprises a color display. In some such embodiments spatial light modulator panel 102 comprises a monochrome spatial light modulator. In such embodiments backlight 104 may comprise three or more monochrome light sources (e.g. red, green and blue lasers) that can each be operated to illuminate phase-modulating panel 108. An image may be displayed by time multiplexing images of different colors. For example, a red image may be displayed based on a red channel of image data using a red light source 106. This may be followed in succession by a green image displayed based on a green channel of image data using a green light source 106 and a blue image displayed based on a blue channel of image data using a blue light source 106. The controller may take into account the wavelength of the light from each light source 106 in setting pixels of phase-modulating plate 108 to phase-modulate light from the light source. In some embodiments backlight 104 comprises a separate unit (e.g. a holographic projector) for each of a plurality of primary colors.

It is not mandatory that highlight image data for driving the highlight projector be derived from image data in real time during display of an image. The highlight image data may be determined in advance and provided as part of the image data, or separately provided. In embodiments which employ a holographic highlight projector, image values for controlling a phase-modulating panel may be determined in advance and provided as part of the image data.

Certain implementations of the invention comprise computer processors which execute software instructions which cause the processors to perform a method of the invention. For example, one or more processors in a display system may implement image processing methods as described herein executing software instructions (which may be or include firmware instructions) in a program memory accessible to the processors. The invention may also be provided in the form of a program product. The program product may comprise any medium which carries a set of non-transitory computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, PROMs, EPROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method for displaying images, comprising:
    spatially modulating first light according to a desired image with a first spatial light modulator;
    Fourier transforming the first light representing the desired image onto a Fourier plane of a Fourier transform component;
    producing second light by attenuating or eliminating one or more frequency components of the Fourier transformed light by a mask positioned on the Fourier plane;
    spatially modulating the second light according to the desired image with a second spatial light modulator;
    generating the first light with a first light source; and
    generating third light with a second light source; and
    wherein the second spatial light modulator is configured to spatially modulate both the second light and the third light according to the desired image, the second light and the third light being spatially overlapped on the second spatial light modulator.

2. The method of claim 1, wherein the first light is Fourier transformed onto the Fourier plane based on diffraction.

3. The method of claim 1, wherein the mask is configured to attenuate or eliminate Fourier components corresponding to one or more spatial frequencies.

4. The method of claim 1, wherein the mask is a fixed or controllable optical mask.

5. The method of claim 1, wherein the first light is Fourier transformed onto the Fourier plane by a phase modulating panel.

6. The method of claim 5, wherein driving values for pixels of the phase modulating panel are determined by an inverse Fourier transform of a desired light distribution.

7. The method of claim 5, wherein phase-shifting effect of the phase modulating panel is spatially varied according to a real component of an inverse Fourier transform of the desired image.

8. The method of claim 1, further comprising:
    controlling, with a controller, the first spatial light modulator to perform phase modulation based on the desired image; and
    controlling, with the controller, the second spatial light modulator to perform intensity modulation based on the desired image.

9. A display system, comprising:
    a first spatial light modulator configured to spatially modulate first light according to a desired image;
    a Fourier transform component configured to Fourier transform the first light representing the desired image onto a Fourier plane;
    a mask positioned on the Fourier plane and configured to produce second light by attenuating or eliminating one or more frequency components of the Fourier transformed light;
    a second spatial light modulator configured to spatially modulate the second light according to the desired image;
    a first light source configured to generate the first light and
    a second light source configured to generate third light and
    wherein the second spatial light modulator is configured to spatially modulate both the second light and the third light according to the desired image, the second light and the third light being spatially overlapped on the second spatial light modulator.

10. The display system of claim 9, wherein the first light is Fourier transformed onto the Fourier plane based on diffraction.

11. The display system of claim 9, wherein the mask is configured to attenuate or eliminate Fourier components corresponding to one or more spatial frequencies.

12. The display system of claim 9, wherein the mask is a fixed or controllable optical mask.

13. The display system of claim 9, wherein the first light source includes a laser and a beam expander.

14. The display system of claim 9, further comprising:
a reflecting or transmitting screen optically coupled to the second spatial light modulator for displaying the desired image.

15. The display system of claim 9, wherein the Fourier transform component to Fourier transform the first light onto the Fourier plane includes a phase modulating panel.

16. The display system of claim 15, wherein driving values for pixels of the phase modulating panel are determined by an inverse Fourier transform of a desired light distribution.

17. The display system of claim 15, wherein phase-shifting effect of the phase modulating panel is spatially varied according to a real component of an inverse Fourier transform of the desired image.

18. The display system of claim 9, further comprising a controller configured to:
control the first spatial light modulator to perform phase modulation based on the desired image; and
control the second spatial light modulator to perform intensity modulation based on the desired image.

* * * * *

UNITED STATES PATENT AND TRADEMARK OFFICE
CERTIFICATE OF CORRECTION

| | |
|---|---|
| PATENT NO. | : 11,637,996 B2 |
| APPLICATION NO. | : 16/660585 |
| DATED | : April 25, 2023 |
| INVENTOR(S) | : Gerwin Damberg et al. |

It is certified that error appears in the above-identified patent and that said Letters Patent is hereby corrected as shown below:

In the Claims

Claim 9, Line 49, In Claim 9, after "the first light", insert --;--

Claim 9, Line 50, In Claim 9, after "third light", insert --;--

Signed and Sealed this
Twenty-seventh Day of August, 2024

Katherine Kelly Vidal
*Director of the United States Patent and Trademark Office*